April 13, 1948.  J. N. KUZMICK  2,439,433
MOLD FOR SLIDE FASTENERS
Filed May 3, 1944  4 Sheets-Sheet 1
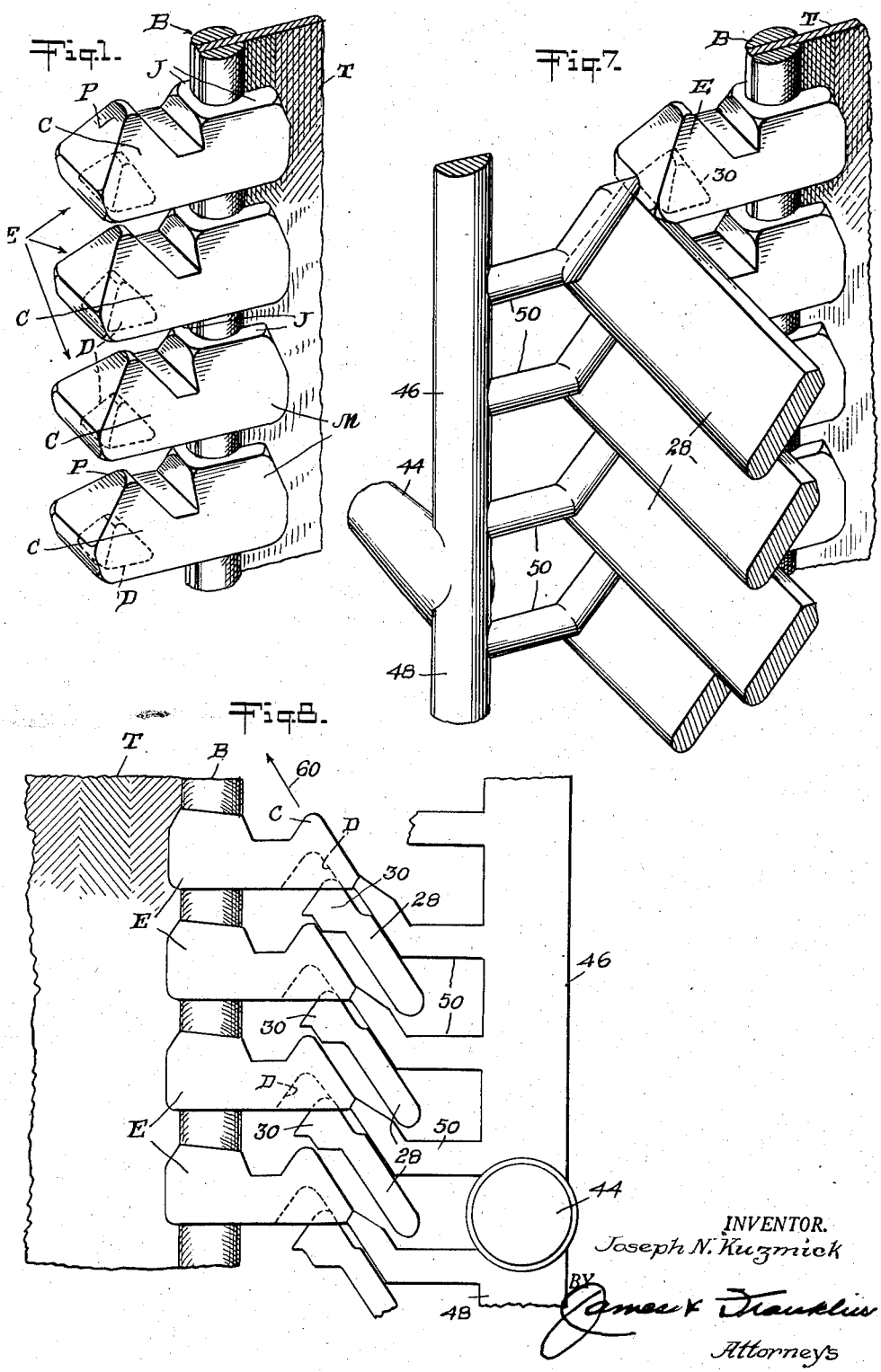
INVENTOR.
Joseph N. Kuzmick
BY
James F. Franklin
Attorneys

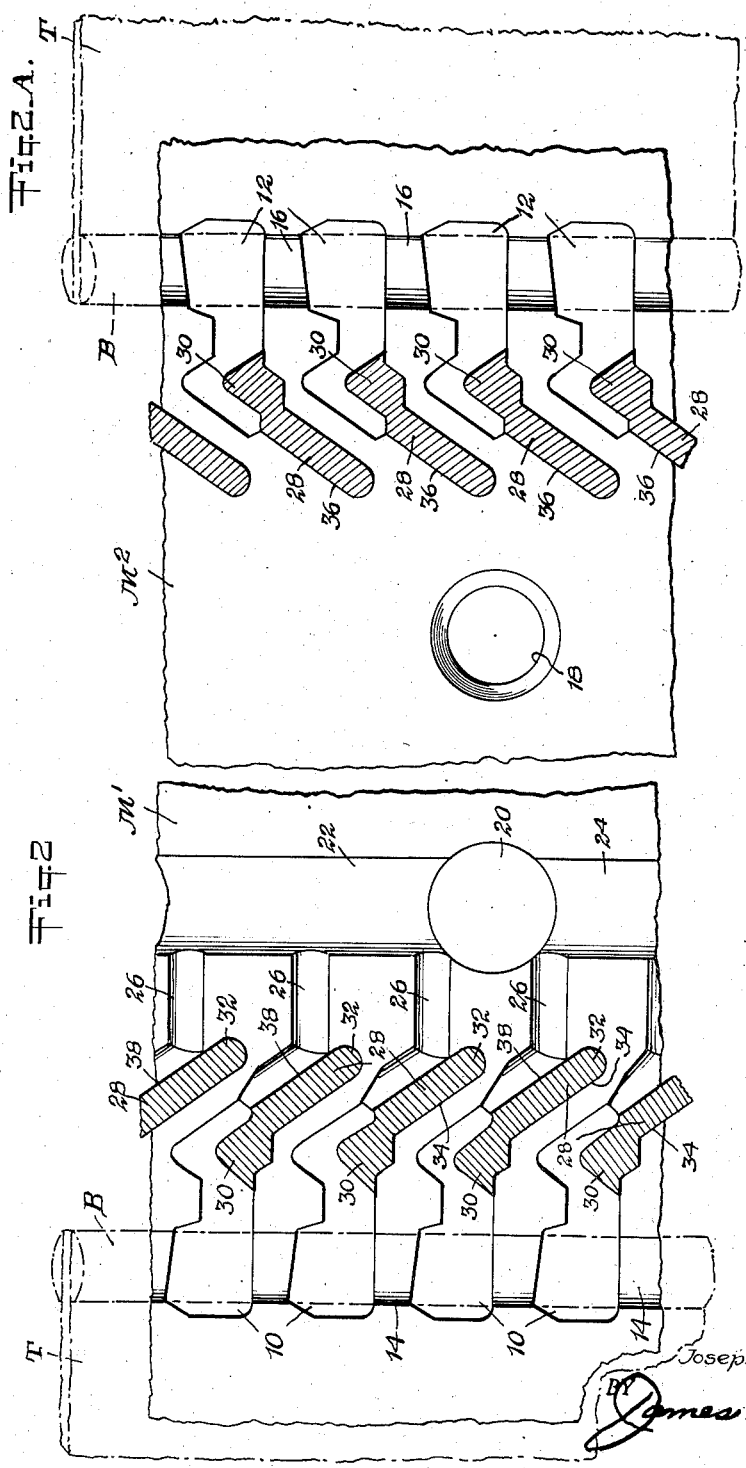

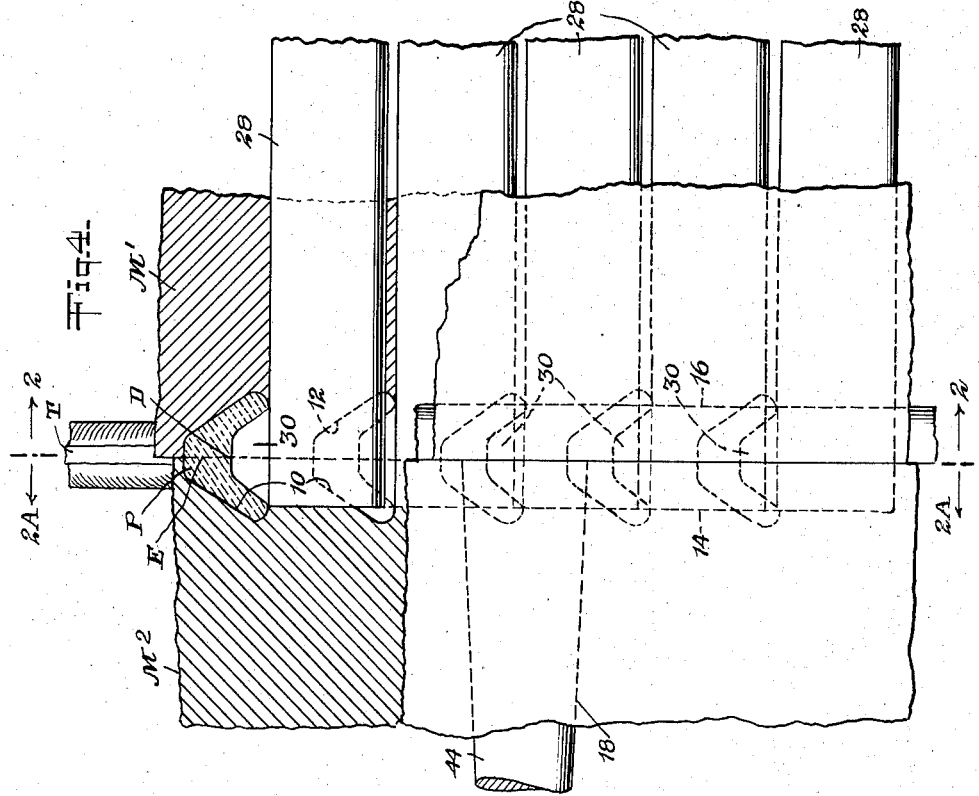
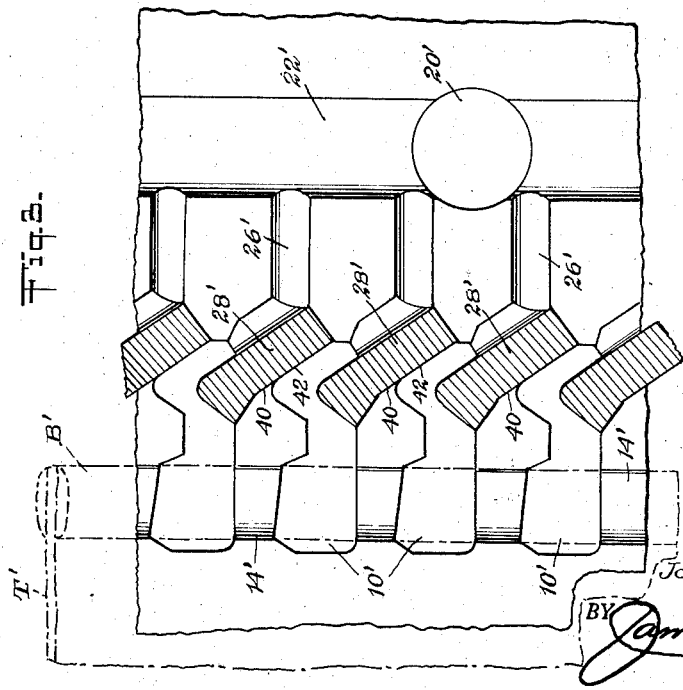

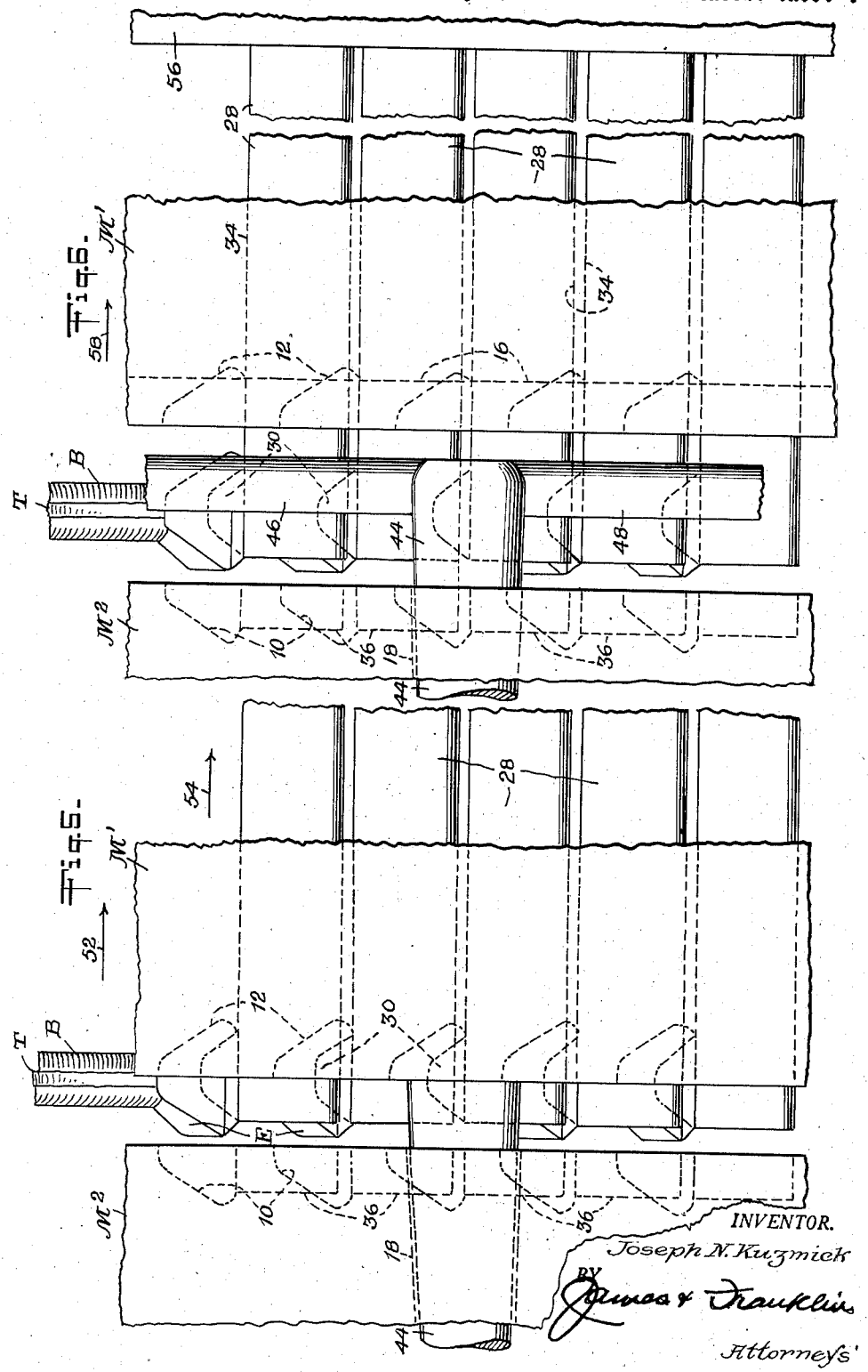

Patented Apr. 13, 1948

2,439,433

UNITED STATES PATENT OFFICE 2,439,433

MOLD FOR SLIDE FASTENERS

Joseph N. Kuzmick, Clifton, N. J., assignor to Conmar Products Corporation, Newark, N. J., a corporation of New Jersey Application May 3, 1944, Serial No. 533,989

11 Claims. (Cl. 18—42)

This invention relates to the manufacture of slide fasteners and more particularly to the molding of conventionally shaped slide fastener elements directly onto a tape.

In the conventionally shaped slide fastener element or scoop, the coupling portion or head of the element has for its coupling or interlocking means a projection on its top face and a depression or pocket on its bottom face. Such an element or scoop may be molded directly onto the edge of a tape in a two-part mold between which the tape is received at the meeting or parting plane of the mold, but a core means must be used to form the depression or pocket in the element head.

Such a mold usually comprises two mold sections separable in the plane of the tape, each mold section having a mold cavity corresponding to one-half of the element or scoop as divided by a vertical medial plane of the element. When the mold sections close with the tape edge between them, these mold cavities mate to define a single mold cavity in the shape of the slide fastener element or scoop except for the pocket or depression. The tape onto which the element or scoop is molded is fed between the mold sections and extends into the thus formed cavity in an amount such that the mounting portion or jaws of the element or scoop is molded onto the tape edge or about the bead of the tape. To complete the mold structure, core means suitably arranged and cooperating with the mold sections must also be provided for forming the element pocket; and runners and sprue channels for the flow of the moldable material to the cavity must also be provided in the mold.

Considerable difficulties, however, are encountered in producing a workable arrangement in which the core means and the runners and sprue channels are positioned and operate without mutual interference. Attempts to solve the involved difficulties have led to processes in which only one scoop at a time is molded onto the tape; but such processes are time consuming and uneconomical. It has also been suggested to use elements or scoops which can be molded onto the tape without the use of cores, but such elements or scoops are of a non-conventional type since the coupling depression must be made so as to be open to a side of the element.

The prime object of my present invention centers about the provision of a mold apparatus for molding conventionally shaped slide fastener elements directly onto the edge of a tape in which a plurality or a group of slide fastener elements or scoops may be molded onto the tape at one time without incurring the difficulties heretofore encountered arising from the interference in positioning and operation between the core members and the runners and sprue channels.

To the accomplishment of this object and such other objects as may hereinafter appear, the present invention relates to the mold as sought to be defined in the appended claims and described in the following specification taken together with the accompanying drawings, in which:

Fig. 1 is a perspective view of a fragment of a slide fastener stringer showing a group of elements or scoops such as are molded at one time onto the tape in the method and mold of the present invention;

Fig. 2 is an elevational and fragmentary view of a section such as the movable section of a two-part mold of the present invention, this view being taken from in front of the parting or meeting plane of the mold section and showing in section core means used according to this invention, the view being taken in cross-section in the plane and in the direction of the line 2—2 of Fig. 4;

Fig. 2A is a similar view of the other, such as the fixed, mold section of the mold and taken in cross-section in the plane and in the direction of the line 2A, 2A of Fig. 4;

Fig. 3 is a view similar to Fig. 2 illustrating a modified mold and core construction;

Fig. 4 is a partially sectioned elevation of the two-part mold showing the two mold sections and the cores in molding position;

Fig. 5 is a similar view of the mold shown in Fig. 4 and showing the mold sections at a stage during their opening operation;

Fig. 6 is a view similar to Fig. 5 showing the mold sections at a further advanced stage of their opening operation and showing the cores separated from the movable mold section;

Fig. 7 is a perspective view of the tape and the parts molded thereon in a single operation and showing the same still supported on the core means, corresponding to the stage of operation shown in Fig. 6; and Fig. 8 is a front elevational view of Fig. 7 and is explanatory of the step of stripping the molded stringer from the supporting core means.

The method of the present invention and the molding apparatus thereof will now be explained first by reference to the product finally obtained and then by reference to the structure of the mold.

Referring first to Fig. 1 of the drawings, the slide fastener stringer produced comprises slide fastener elements or scoops E molded in spaced relation at the edge and around the bead B of a suitable tape T. Each of the elements or scoops E is conventionally shaped and comprises a coupling portion or head C and a mounting portion M. The coupling portion or head C of each element has for interlocking or coupling purposes the projection P on one face and the depression D on its opposite face. The mounting portion M consists of the two jaws J, J. The stringer portion shown in Fig. 1 may be taken to represent the product obtained in a single operating step of the method of the present invention, namely, a plurality or group of elements or scoops E molded at one time onto the tape.

It will be understood that the product of Fig. 1 is obtained after the appending sprues have been removed from the product as molded, and that the stringer of Fig. 1 is only representative since a smaller or a larger number of elements may comprise the group of elements or scoops which is simultaneously produced in a molding step.

Referring now to Figs. 2 and 2A, the mold of the present invention is shown to comprise a two-part mold having a movable section or ejector die M' and a fixed section or cover die $M^2$, which are adapted to mate as shown in Fig. 4 of the drawings. The two mold sections M' and $M^2$ are adapted to receive between them the edge of the tape T, the tape being held in a linear or straight and, therefore, in a flat condition and have a meeting plane coincident with the plane of the tape. These mold sections M' and $M^2$ are provided with linearly arranged mold cavities 19, 19 for the mold section M', and linearly arranged mold cavities 12, 12 for the mold section $M^2$. Each of the mold cavities 10, 10 and each of the mold cavities 12, 12 corresponds to one-half of the element or scoop as divided by a vertical medial plane of the element. Therefore, when the mold sections M' and $M^2$ close with the edge of the tape between them, each of the mold cavities 19 mates with its counterpart mold cavity 12 to define a single mold cavity in the shape of the slide fastener element or scoop except for the pocket or depression D which is to be formed in the element. The mold M' is also provided with interconnecting channel cavities 14, 14 and the mold cavity $M^2$ is correspondingly provided with the interconnecting channel cavities 16, 16 for the purpose of receiving the bead B of the tape T.

The mold sections M' and $M^2$ are formed with suitable runners and sprue channels for the flow of the moldable material, an injection molding method being preferably used with the mold of the present invention. To this end the fixed mold section $M^2$ is formed with a main charging duct 18 the mouth of which communicates with a suitable injection nozzle (not shown) and the movable mold section M' is formed with a depression 20 registering with the main duct 18. The depression 20 opens in the opposite directions to runners 22 and 24 formed in the mold section M' and sprue channels 26, 26 are also formed in this movable mold section connecting for intercommunication the runners with the cavities 10, 10, and hence with the formed cavities of the mold. Thus it will be noted that it is preferred to form the runners and the sprue channels in only one of the two mold sections, these thus having a semi-circular cross-section.

For defining and forming the depressions or pockets D of the elements, I provide core means comprising the plurality of core members 28, 28. Each core member has a core part 30 for forming the pocket and a supporting stem or core bar 32.

To carry out the object of the present invention, each core member 28 is so constructed, mounted and operated that the core part 30 thereof is positionable in the formed mold cavity 10—12 for defining the pocket of the element, and is so positioned, mounted and operated that it is compatible with the arrangement and operation of the runners and sprue channels, the construction being, moreover, such that a plurality or group of core members may be employed so that a plurality or group of slide fastener elements or scoops may be molded in a single operating step of the method.

This object is attained by mounting the core members 28, 28 on one of the mold sections and preferably on the movable mold section M', and mounting the same on said mold section so that the core members are movable thereon transversely of the meeting plane of such mold section. Still referring to Fig. 2 of the drawing, each stem 32 of the core members is mounted on and carried by the mold section M' and is movable transversely of the meeting or parting plane of this mold section, each core member being thus mounted for reciprocable movement in the mold section, in a through channel 34 formed in the mold section. The fixed mold section $M^2$ is in turn provided with registering depressions or cavities 36, 36 for receiving the cavity intruding ends of the core members 28, 28. It will be noted that considering two adjacent or consecutive mold cavities 10—12, 10—12, a core part 30 is positioned between two successive cavities and it will also be noted that the cavity intruding part of its core member is positioned between two successive sprue openings. By reason of this arrangement of the core members, all interference between the positioning and operation thereof and the positioning and use of the runners and sprue channels is not only eliminated, but a plurality or group of slide fastener elements may be molded in one operating step of the method.

This provided for construction and arrangement also possesses other advantages. Thus, as will be evident from a consideration of Fig. 2, the stems 28, 28 of the core members, mounted inclinedly in the mold section M', have their upper faces 38 contiguous to the correspondingly inclined part of the sprue channels 26 so that the formed or molded channel stem and connecting sprues are supported by the stems of the core members when the mold sections are separated. This construction may be also modified as shown in Fig. 3 of the drawings so that the bottom faces 40, 40 of the modified core stems 28', 28' shown in this figure are just contiguous to the edge 42, 42 of the mold cavity 10', 10' whereby the cores not only help define the mold cavities but serve to further support at their faces 40, 40 the tape with its molded elements and appending channel stem and sprues. Other parts in the modification of Fig. 3 are similar to those of Fig. 2 and are designated by corresponding but primed reference characters.

In Figs. 4 to 8 are depicted sequential steps in the method of the present invention. Fig. 4 depicts the condition of operation with the mold sections M' and $M^2$ closed just after a molding operation. Fig. 5 depicts an immediately subsequent stage of the operation, the movable mold M' and its associated parts being shown separating from the fixed mold $M^2$. Fig. 6 depicts the next immediate stage of operation wherein the tape T and the parts which have been molded thereto are separated from the movable mold section M' and are supported solely by the core members 28, 28. Fig. 7 depicts the parts minus the mold sections when the tape and the parts molded thereto have been completely separated from the mold sections but are still supported by the core members. And Fig. 8 depicts the final stage in the operation which consists in stripping the tape and its molded parts from the core members 28.

When the mold sections M' and M² are closed (Fig. 4), the core members 28, 28 assume the position shown in Fig. 4 with their core parts 30, 30 all properly positioned in the formed cavities 10—12 of the mold. A moldable material is then injected into the mold through the main charging channel 18 and the same flows through the runners and sprue channels into the mold cavities filling the same and thereby forming the elements E, the mounting portions of which are molded about the bead of the tape also forming at the same time the main channel plug or sprue 44, the runner stems 46 and 48 (see Fig. 6) and the element connecting channels or gates 50, 50 (for the latter see particularly Figs. 7 and 8). After this injection step, the mold sections are separated by moving the mold section M' together with its carried core members 28, 28 in the direction indicated by the arrows 52, 54 in Fig. 5 of the drawings. All of the core members 28, 28 are carried by or fixed to a support or rack 56 as shown in Fig. 6 of the drawings which, at a predetermined point of the movement of the mold section M', is stopped while the mold section is permitted to continue its movement in the direction indicated by the arrow 58 in Fig. 7. Thus a knockout or ejecting movement of the core members 28, 28 is produced, the core parts 30, 30 thereof being thus freed from both of the mold sections M² and M', as clearly depicted in Fig. 6 of the drawings, in which position the tape and the molded parts are supported solely by the termini or core parts of the core members as best shown in Fig. 7 of the drawings. In practice the mold section M' with its carried parts is moved prior to the knockout operation a greater distance than is indicated in Fig. 6 of the drawings, so that the sprue 44 is free to clear the fixed mold section M². It will be understood that the construction depicted in Fig. 6 is also exemplary of a modified operation wherein the mold section M' together with its carried parts are all moved in the direction indicated by the arrow 58 to a stop position, whereupon the knockout or ejecting operation is produced by moving the rack 56 and its associated core members 28 in the opposite direction and into the position indicated in Fig. 6 of the drawings.

In the knockout position the tape and the molded parts are solely supported, free of both mold sections, at the termini of the core members 28, 28, as best shown in Fig. 7. It is desirable at this stage of the operation to firmly support the tape and molded parts in position and this is obtained by the disposition as well as the form and shape imparted or given to the core members as explained above in connection with both Fig. 2 and Fig. 3 of the drawings. With a firm support, suitable means may be used at this stage to cut off from the elements E the gate, runner and sprue appendages 44 to 50. However, it is also contemplated to retain these appendages for removal at a subsequent step of the operation. Thus supported on the core members 28, 28, the tape T and its molded parts may then be removed from the core members 28, 28 by relatively moving the former with reference to the latter in the direction indicated by the arrow 60 in Fig. 8 of the drawings. In this movement the tape and the molded elements are freed from the core supports, whereupon a new section of the tape is fed in position and the mold sections are closed for molding a successive group of slide fastener elements.

The practice of the method of the present invention and the construction and operation of the mold thereof will in the main be fully apparent from the above detailed description. By means of this method and molding apparatus a plurality or a group of slide fastener elements or scoops of conventional shape may be molded onto the tape at one time. This may be accomplished by means of a mold and core members, the core members being desirably mounted and supported in one of the mold sections. The construction and operation are furthermore such that a group of elements may be simultaneously molded employing a group of core members which, nevertheless, may be so disposed as not only not to interfere with the injection runners and sprue channels, but which may be employed to assist in supporting the molded runner stems and sprues and thus aid in handling and feeding the molded product after each molding operation.

It will be understood that according to the present invention any molding material may be used which can be reduced to a plastic state by heat, such as thermoplastic and thermosetting materials and metals and alloys suitable for die casting. It will also be understood that changes may be made in the method and in the apparatus described without departing from the spirit of the invention defined in the following claims.

I claim:

1. A mold for directly molding at one time onto the edge of a tape a plurality of slide fastener elements having heads with sloping front walls and pockets formed in the heads for interlocking purposes, said mold comprising two mold sections relatively reciprocable toward and away from one another and adapted to receive the tape therebetween, the parting plane of the mold sections corresponding to the plane of the tape, said mold sections having mold cavities which define a plurality of slide fastener elements spaced along the edge of the tape, core members positionable in said cavities for defining the pockets of the elements, each core being mounted on the longitudinal edge of a flat core bar near one end of the bar, said bars passing slidably through one of said mold sections for movement in the direction of movement of the mold sections.

2. A mold for directly molding at one time onto the edge of a tape a plurality of slide fastener elements having heads with sloping front walls and pockets formed in the heads for interlocking purposes, said mold comprising two mold sections relatively reciprocable toward and away from one another and adapted to receive the tape therebetween, the parting plane of the mold sections corresponding to the plane of the tape, said mold sections having mold cavities which define a plurality of slide fastener elements spaced along the edge of the tape, core members positionable in said cavities for defining the pockets of the elements, each core being mounted on the longitudinal edge of a flat core bar near one end of the bar, said bars passing slidably through one of said mold sections for movement in the direction of movement of the mold sections, said bars when viewed in section being tilted at an angle approximately the same as the slope of the front wall of the element head.

3. A mold for directly molding at one time onto the edge of a tape a plurality of slide fastener elements having heads with sloping front walls and pockets formed in the heads for interlocking purposes, said mold comprising two mold sections relatively reciprocable toward and away from one another and adapted to receive the tape therebetween, the parting plane of the mold sections corresponding to the plane of the tape, said mold sections having mold cavities which define a plurality of slide fastener elements spaced along the edge of the tape, core members positionable in said cavities for defining the pockets of the elements, each core being mounted on the longitudinal edge of a flat core bar near one end of the bar, said bars passing slidably through one of said mold sections for movement in the direction of movement of the mold sections, said mold having a sprue and gates leading to the mold cavities, said gates extending across the aforesaid bars and leading to the bottom edge of the front wall of the element head.

4. A mold for directly molding at one time onto the edge of a tape a plurality of slide fastener elements having heads with sloping front walls and pockets formed in the heads for interlocking purposes, said mold comprising two mold sections relatively reciprocable toward and away from one another and adapted to receive the tape therebetween, the parting plane of the mold sections corresponding to the plane of the tape, said mold sections having mold cavities which define a plurality of slide fastener elements spaced along the edge of the tape, core members positionable in said cavities for defining the pockets of the elements, each core being mounted on the longitudinal edge of a flat core bar near one end of the bar, said bars passing slidably through one of said mold sections for movement in the direction of movement of the mold sections, said bars when viewed in section being tilted at an angle approximately the same as the slope of the front wall of the element head, said mold having a sprue and gates leading to the mold cavities, said gates extending across the aforesaid bars and leading to the bottom edge of the front wall of the element head.

5. A mold for molding a plurality of slide fastener elements directly on the edge of a tape, each of said elements having a pocketed head with a sloping front wall, said mold comprising a cover die and an ejector die reciprocable toward and away from the cover die with the tape therebetween, said die portions having cavities defining a plurality of slide fastener elements spaced along the edge of the tape, a plurality of cores for defining the pockets in the heads, each core being carried on the longitudinal edge of a flat core bar near one end of the core bar, said core bars being slidably received in the ejector die for movement in the direction of movement of said die, and means connecting said core bars for movement in unison, whereby on opening of the die the cores may be moved to a position intermediate the cover and ejector dies, thereby separating the elements from the ejector die.

6. A mold for molding a plurality of slide fastener elements directly on the edge of a tape, each of said elements having a pocketed head with a sloping front wall, said mold comprising a cover die and an ejector die reciprocable toward and away from the cover die with the tape therebetween, said die portions having cavities defining a plurality of slide fastener elements spaced along the edge of the tape, a plurality of cores for defining the pockets in the heads, each core being carried on the longitudinal edge of a flat core bar near one end of the core bar, said core bars being slidably received in the ejector die for movement in the direction of movement of said die, said core bars when viewed in section being tilted at an angle approximately the same as the angle of the front wall of the element head, and means connecting said core bars for movement in unison, whereby on opening of the die the cores may be moved to a position intermediate the cover and ejector dies, thereby separating the elements from the ejector die.

7. A mold for molding a plurality of slide fastener elements directly on the edge of a tape, each of said elements having a pocketed head with a sloping front wall, said mold comprising a cover die and an ejector die reciprocable toward and away from the cover die with the tape therebetween, said die portions having cavities defining a plurality of slide fastener elements spaced along the edge of the tape, a plurality of cores for defining the pockets in the heads, each core being carried on the longitudinal edge of a flat core bar near one end of the core bar, said core bars being slidably received in the ejector die for movement in the direction of movement of said die, said cover die having a sprue-hole leading to gate passages at the parting plane, said gate passages terminating in gates extending transversely of the core bars and leading into the bottom edges of the front walls of the element heads, and means connecting said core bars for movement in unison, whereby on opening of the die the cores may be moved to a position intermediate the cover and ejector dies, thereby separating the elements from the ejector die.

8. A mold for molding a plurality of slide fastener elements directly on the edge of a tape, each of said elements having a pocketed head with a sloping front wall, said mold comprising a cover die and an ejector die reciprocable toward and away from the cover die with the tape therebetween, said die portions having cavities defining a plurality of slide fastener elements spaced along the edge of the tape, a plurality of cores for defining the pockets in the heads, each core being carried on the longitudinal edge of a flat core bar near one end of the core bar, said core bars being slidably received in the ejector die for movement in the direction of movement of said die, said core bars when viewed in section being tilted at an angle approximately the same as the angle of the front wall of the element head, said cover die having a sprue-hole leading to gate passages at the parting plane, said gate passages terminating in gates extending upwardly along and transversely of the core bars and leading into the bottom edges of the front walls of the element heads, and means connecting said core bars for movement in unison, whereby on opening of the die the cores may be moved to a position intermediate the cover and ejector dies, thereby separating the elements from the ejector die.

9. A mold as defined in claim 1, in which the mold includes sprue, runner, and gate passages leading to the mold cavities, and in which the bars and gate passages are so relatively located as not to intersect, whereby the tape, elements, gates, runner, and sprue may be stripped from the cores after the mold is opened.

10. A mold as defined in claim 1, in which the mold includes sprue, runner and gate passages leading to the mold cavities, and in which the bars are disposed parallel to one another, and in which the gate passages are disposed parallel to one another and transversely of the longitudinal axis of the bars.

11. A mold as defined in claim 1, in which the mold includes sprue, runner and gate passages leading to the mold cavities, and in which the bars are disposed parallel to one another, and in which the gate passages are disposed parallel to one another and transversely of the longitudinal axis of the bars, and in which the gate passages are disposed between the bars so that the gate passages and bars do not intersect, whereby the tape, elements, gates, runner and sprue may be stripped from the cores after the mold is opened.

JOSEPH N. KUZMICK.

REFERENCES CITED

The following references are of record in the file of this patent:

UNITED STATES PATENTS

| Number | Name | Date |
|---|---|---|
| 2,074,368 | Corner | Mar. 23, 1937 |
| 2,197,968 | De Mattia | Apr. 23, 1940 |
| 2,282,308 | Dahlin | May 12, 1942 |
| 2,297,070 | Poux | Sept. 29, 1942 |
| 2,302,912 | Poux | Nov. 24, 1942 |
| 2,330,369 | Marsh | Sept. 28, 1943 |
| 2,360,011 | Popp | July 10, 1944 |

FOREIGN PATENTS

| Number | Country | Date |
|---|---|---|
| 361,092 | Great Britain | Nov. 19, 1931 |